April 11, 1950 G. D. BAGLEY 2,503,372
HIGH VACUUM INDICATOR
Filed Sept. 7, 1945
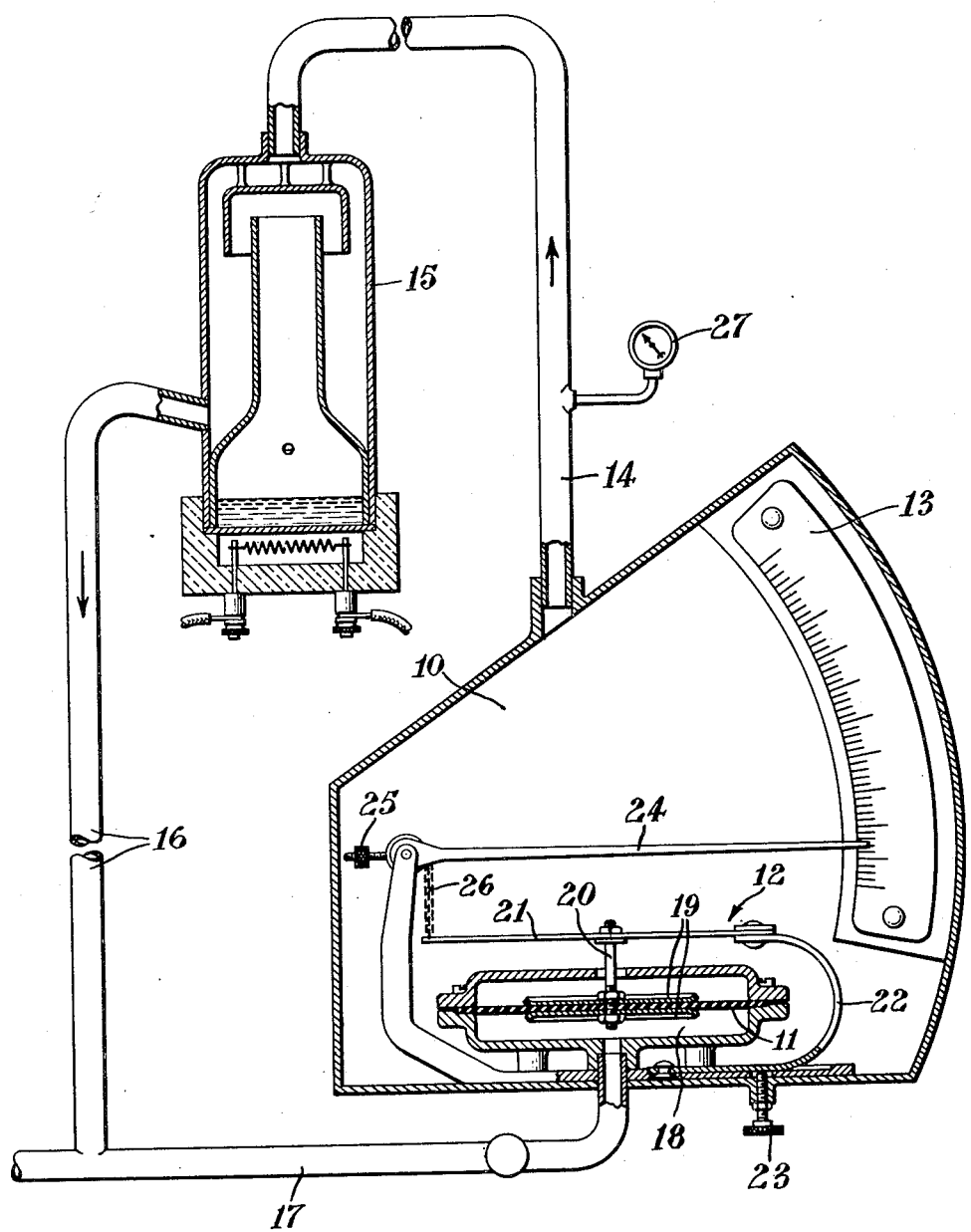
INVENTOR
GLEN D. BAGLEY
BY
ATTORNEY Patented Apr. 11, 1950

2,503,372

UNITED STATES PATENT OFFICE 2,503,372

HIGH VACUUM INDICATOR

Glen David Bagley, Lewiston, N. Y., assignor, by mesne assignments, to Union Carbide and Carbon Corporation, a corporation of New York Application September 7, 1945, Serial No. 614,998

14 Claims. (Cl. 73—407)

This invention relates to high vacuum indicators and has for an object to provide a simple, rugged, satisfactory, and unusually accurate device of this class that requires less frequent calibration than do many of the devices in common use. Another object is to provide a vacuum indicator and pump in which the necessity for a fore pump has been eliminated and the exhaust from the vacuum pump is connected to the line whose vacuum is to be measured. A further object is to provide an arbitrary zero for comparison with the low pressure to be measured by means of a differential pressure responsive device such as a diaphragm and in which an indicator and amplifying mechanism are enclosed in one of the low pressure chambers formed on each side of the diaphragm so that no moving parts have to extend through a chamber wall and be subjected to the friction that would be necessary to effect a satisfactory seal if a moving part extended outside. Yet another object is to provide a safety device to protect the diaphragm against excessive distortion in event of a leak from the atmosphere. Still a further object is to provide a method of measuring a high vacuum by amplifying a small movement of a pressure responsive device to obtain large deflections on a scale reading.

Existing type vacuum indicators for obtaining better results than are provided by the ordinary closed end mercury manometer or ordinary dial type gage include, for example, the McLeod gage, the Pirani gage, and the ionization gage. The McLeod gage depends on Boyle's law for perfect gases where the pressures and volumes of a gas are taken at two different times. This type gage does not actually register pressures when condensable gas and vapors are used and as frequently happens when a fairly large amount of tubing is used in connecting the gage to a given system an appreciable amount of time, possibly a minute is needed for the gage and system to reach the desired condition. The Pirani gage depends for its operation on the thermoconductivity of a gas and its relation to pressure. In the Pirani gage also there is need for recalibration for each particular gas composition being measured and such calibration is very easily disturbed. The ionization gage depends for its operation upon the fact that the degree of ionization of a gas under given current conditions varies with the pressure. This latter gage is also open to the objections of needing frequent calibration for each new gas composition. It is useful in only a narrow range and at very low pressures, and its calibration is easily disturbed.

The present invention provides a process and apparatus for measuring high vacua in which the aforementioned disadvantages have been eliminated. Specifically the preferred embodiment contemplates a pressure responsive device like a diaphragm separating closed chambers on each side of it; that on the one side is connected to the line whose low pressure is to be measured and on the other side a vapor type vacuum pump preferably of the diffusion type exhausts the chamber to an arbitrary zero. The exhaust from the vacuum pump is connected with the line whose pressure is to be measured thereby dispensing with the necessity of having any fore pump. The mechanical amplifying and indicating mechanism may be entirely enclosed within the arbitrary zero chamber. In the event of an unexpected leak, pressures on both sides of the diaphragm become substantially equalized to safeguard it against excessive distortion.

The single figure of the drawing is a somewhat conventional illustration of a preferred embodiment of the present invention.

A resilient diaphragm 11 has one side of it, in this case the top side, exposed to the gas pressure within a chamber 10. A mechanical amplifying and indicating mechanism 12 cooperates with a scale 13 to indicate the degree of low gas pressure in a line 17 whose vacuum is to be measured, compared with the gas pressure in the chamber 10 where an arbitrary zero is created by means of a vapor type vacuum pump 15 which when operating exhausts the air or other gas from the chamber 10 through the exhaust line 14. The discharge from the vacuum pump leads through a connection 16 to the line 17 and the enclosed chamber 18 on the line side of the diaphragm.

Preferably, a pair of metal plates 19 are clamped one on each side of the diaphragm to enhance its strength and rigidity, a rod 20 connecting such plates and diaphragm with a spring member 21 shown as being mounted at its right end on a zero adjusting spring 22 provided with a customary thumb screw 23 for adjusting the spring to the zero of the scale 13. When it is desired to change the range of the scale indications, a stiffer or less stiff spring may be used. Motion of the spring 21 is transmitted to the scale pointer 24 through the chain 26, an adjustable counterweight 25 being mounted on the end of the pointer remote from the scale.

A preferred type indicating and amplifying mechanism is that manufactured by Hayes Corporation, Michigan City, Indiana and known as Hays Standard Diaphragm Mechanism P5, described in Bulletin 43—667 of the manufacturer to have a range of pressure of from zero to 0.8″ of water. Scale is type P 80 of the same manufacturer.

Any one of several different vapor types of vacuum pumps may be used to perform the function of the pump 15. The Gaede type diffusion pump is not in general use in its original form although such is described in an article on "Production and Measurement of High Vacuum" by S. Dushman in the General Electric Review 1920-21 and also in an article by I. Langmuir, Journal of Franklin Institute, 182, 719 (1916). The Langmuir condensing pump has a range of approximately 0-150 microns of mercury. An example of a pump of this Langmuir condensing class is the Kaye pump illustrated in Fig. 11, page 9 of the "High Vacuum Technique by J. Yarwood, published in London 1943 by Chapman and Hall, Ltd. The jet pump is another type of diffusion pump and is shown in Fig. 9 on page 9 of the Yarwood publication as a Volmer pump. The range of jet pumps is approximately 0-15 millimeters of mercury and a commercial pump of the jet class is manufactured by Distillation Products, Inc. of Rochester, New York. The type of pump chosen in a given instance will depend on the particular conditions; one desirable example is a Gaede Two-Stage Diffusion Pump known as type G, No. 12020 from list No. XXI of E. Leybold's Nachfolger A. G.

While vapor pumps are not essential, they are preferred for their safety feature in being able to insure equalization of pressures on both sides of the diaphragm in event of a leak. One diffusion pump may operate with electric heating when the pressure in the line becomes about 8 millimeters of mercury or less and will furnish a by-pass safety feature at pressures above 8 millimeters of mercury; that is, it will allow gas to pass when the differences in pressure on opposite sides of the diaphragm exceeds 8 millimeters of mercury or thereabouts. There is no single numerical pressure differential that should be given at which pumps will cease to operate as this will vary from class to class and from individual pump to individual pump. It depends upon such factors as the amount of pumping medium in the system, the amount, rate of flow, and temperature of the cooling medium, etc. In event a leak might occur and the pump not be functioning, then in order to avoid being misled, a conventional type of ordinary vacuum dial gage 27 or a closed end mercury manometer may be connected to the chamber 10 for the purpose of showing that the arbitrary zero in the chamber 10 does not exist. Such indicator 27 is used only to make sure that the vacuum pump is properly functioning and that the lower pressure differential which might be indicated by scale 13 is in fact a high vacuum and not merely a lower pressure differential which might be caused in the case of a leak from the atmosphere.

Among the advantages of this invention may be mentioned the ability of the vapor type pump to allow gas pressure of more than a given amount to pass from the output to the input side as a safety feature which precludes the diaphragm being subjected to distortion from pressures exceeding the amount needed to stop the pump. Freedom from frequent calibration is another important advantage of this invention. The gage of the type mentioned has a range of from 0 to 1600 microns of mercury in 20-micron increments using the scale described. In this way, about one millimeter of mercury may effect about six inches of scale deflection. Of course the chamber illustrated on each side of the diaphragm must be vacuum tight. Generally speaking, the invention may be applied to any low pressure line in which the absolute pressure is less than the pressure at which the vapor pump breaks down. Industrial application for this invention may be found, for example, in the high vacuum, thermal-reduction processes for the production of calcium, magnesium, sodium, etc., and also in the high vacuum processing of vitamin-rich oils and in the high vacuum production of penicillin. Oil and other liquids may be used in the diffusion pump but it is generally better to use that liquid recommended by the manufacturer of the pump. The various parts including the pump 15, indicating mechanism 12, and connecting pipes 14, 16 and 17, are not necessarily only of the relative sizes illustrated.

I claim:
1. The combination with a diaphragm, of a chamber on each side of the diaphragm with said diaphragm constituting a portion of the wall of each, a vapor type vacuum pump connected to exhaust gas from one chamber, a line the low gas pressure of which is to be measured being connected to the opposite chamber, an indicator responsive to movement of said diaphragm, and the output of said vacuum pump being connected to said opposite chamber.

2. The combination with a diaphragm, of a chamber on each side of the diaphragm with said diaphragm constituting a portion of the wall of each, a vapor diffusion type vacuum pump connected to exhaust gas from one chamber into the opposite chamber, a line the low gas pressure of which is to be measured being connected to the opposite chamber, and an amplifier and indicator in one chamber responsive to movement of said diaphragm.

3. A vacuum indicator comprising a diaphragm, a chamber on each side of said diaphragm, a vapor type vacuum pump means connected to exhaust gas from the chamber on one side of the diaphragm, a line the low gas pressure of which is to be measured being connected to the chamber on the opposite side of said diaphragm, an indicator responsive to movement of said diaphragm, and safety means for equalizing pressures on both sides of said diaphragm in event of a leak of atmospheric pressure into said line.

4. A vacuum indicator comprising a diaphragm, a chamber on each side of said diaphragm, a vapor type vacuum pump means connected to exhaust gas from the chamber on one side of the diaphragm, a line the low gas pressure of which is to be measured being connected to the chamber on the opposite side of said diaphragm, an indicator responsive to movement of said diaphragm, and safety means for equalizing pressures on both sides of said diaphragm in event of a leak of atmospheric pressure into said line, said last mentioned means including a connection from the output side of said vapor type vacuum pump means to the line and said pump means being of the vapor diffusion type in which excess pressure may pass therethrough.

5. A vacuum indicator comprising a chamber, a vapor type vacuum pump connected thereto for exhausting gas from said chamber, a second chamber, a line the low gas pressure of which is to be measured being connected to the second chamber, a device responsive to the difference in gas pressures between said chambers and responsive to movement of said pressure device, an indicator responsive to movement of said device and a passage connecting the output of said vacuum pump with said line.

6. A vacuum indicator comprising a chamber, a vapor type vacuum pump connected thereto for exhausting gas from said chamber, a second chamber, a line the low gas pressure of which is to be measured being connected to the second chamber, a device responsive to the difference in gas pressures between said chambers, an indicator responsive to movement of said pressure device, a passage connecting the output of said vacuum pump with said line, and said indicator including mechanical means for amplifying the movement of said pressure device and said indicator being located in the first or lower pressure chamber.

7. The combination with a diaphragm, of a chamber on each side thereof, a vapor diffusion type vacuum pump for exhausting one chamber, an indicator in said one chamber responsive to movement of said diaphragm, a line the vacuum of which is to be measured being connected to the opposite chamber, a connection between the outlet of said pump and said line, and a second vacuum indicator independent of the pressure difference between said chambers connected to one of said chambers to indicate the apparatus to be functioning.

8. A high vacuum indicator comprising a flexible pressure responsive means between two chambers, vacuum pump means connected to one of said chambers, a line the vacuum of which is to be measured connected to the other chamber, a by-pass between said chambers, safety means in said by-pass automatically responsive to a pressure difference between said chambers of at least about .15 to 15 millimeters of mercury for equalizing pressures in said chambers, and indicating means responsive to movement of said pressure responsive means for indicating the pressure difference between said chambers.

9. A high vacuum indicator comprising a flexible diaphragm between two chambers, a vapor type vacuum pump connected to exhaust one of said chambers, a line the vacuum of which is to be measured connected to the other chamber and being at a pressure below that at which the vapor type pump breaks down, a connection between said line and the output of said pump whereby the pump functions as a safety device and pressures in said chambers may be substantially equalized whenever the pressure difference between said chambers is sufficient to cause a breakdown of said vapor pump, and means responsive to flexure of said diaphragm for indicating the difference in pressure between said chambers.

10. A high vacuum indicator comprising a flexible diaphragm between two chambers, a vacuum pump means connected to exhaust one of the chambers, a line the vacuum of which is to be measured connected to the other chamber, a by-pass between said chambers around said diaphragm, safety means in said by-pass responsive to a pressure difference between said chambers of more than about 8 millimeters of mercury for equalizing pressures in said chambers, and indicating means responsive to movement of said diaphragm, said safety means and vacuum pump means being constituted by a vapor type vacuum pump having a breakdown occurring under pressure differences of more than about said 8 millimeters of mercury.

11. A high vacuum indicator having a flexible pressure responsive means, a chamber on each side of and connected to said pressure responsive means, vapor type vacuum pump means for exhausting one of said chambers, a line the vacuum of which is to be measured connected to the other of said chambers, an indicator responsive to movement of said pressure responsive means, and safety means to insure the absence of any pressure differential on said flexible pressure responsive means of an amount sufficient to damage said pressure responsive means or to require recalibration thereof, said safety means being automatically responsive to a pressure difference in said chambers above a predetermined amount and being constituted by said vapor type vacuum pump means.

12. A high vacuum indicator comprising a flexible diaphragm between two chambers, a vapor type vacuum pump means connected to one of the chambers, a line the vacuum of which is to be measured connected to the other chamber, a by-pass between said chambers, safety means in said by-pass responsive to a pressure difference between said chambers of less than enough to require recalibration of said diaphragm, said safety means and vapor type vacuum pump means being one and the same, indicating means responsive to movement of said pressure responsive means for indicating the pressure difference between said chambers, and a second vacuum indicating means less sensitive than the first indicating means, independent of said diaphragm, and connected to one of said chambers.

13. A high vacuum indicator comprising a flexible diaphragm between two chambers, a vapor type vacuum pump means connected to one of the chambers, a line the vacuum of which is to be measured connected to the other chamber, a by-pass between said chambers, safety means in said by-pass responsive to a pressure difference between said chambers of a predetermined amount, and indicating means responsive to movement of said pressure responsive means for indicating the pressure difference between said chambers, said predetermined amount of pressure difference being less than enough to require recalibration of said indicator and the safety means and vacuum pump means being one and the same.

14. A high vacuum indicator comprising a flexible diaphragm, a chamber on each side of said diaphragm, a vacuum pump means connected to one chamber, a line the low pressure of which is to be measured connected to the other chamber, a by-pass between said chambers around said diaphragm, safety means in said by-pass for equalizing pressures in said chambers in response to a pressure difference between said chambers of a low amount less than that stressing said diaphragm an amount requiring its recalibration, and indicating means responsive to flexure of said diaphragm.

GLEN DAVID BAGLEY.

REFERENCES CITED

The following references are of record in the file of this patent:

UNITED STATES PATENTS

| Number | Name | Date |
|---|---|---|
| 1,734,135 | Kobel | Nov. 5, 1929 |
| 1,870,058 | Levine | Aug. 2, 1932 |
| 2,309,401 | Kollsman | Jan. 26, 1943 |